Figure 1:
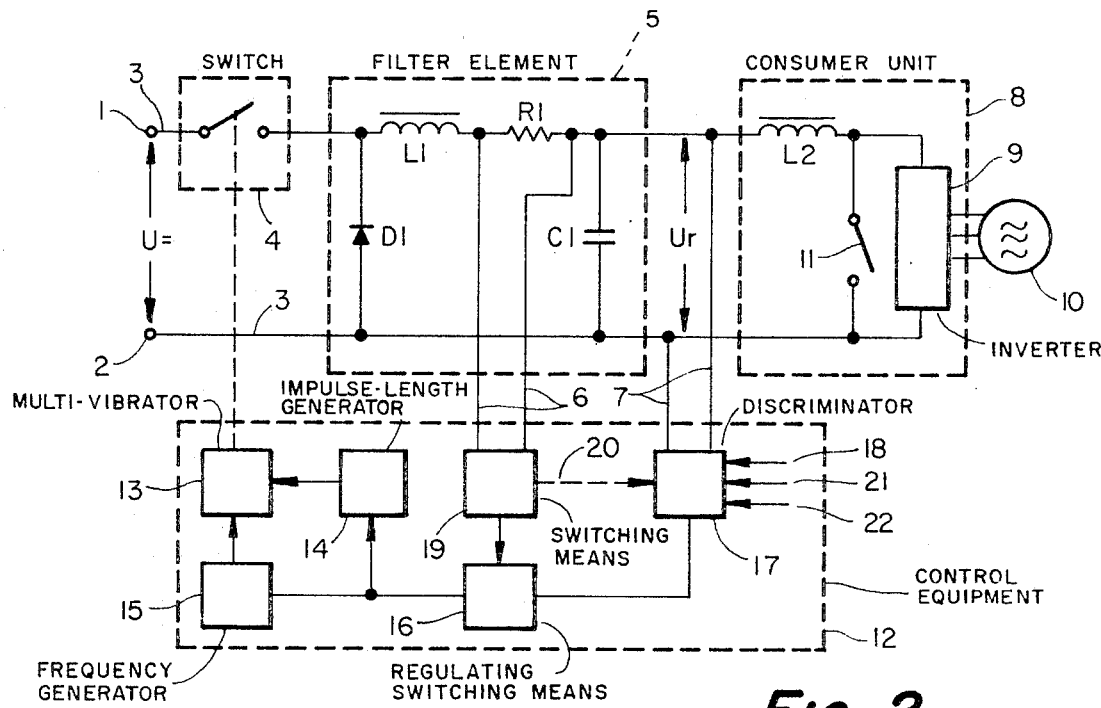

United States Patent

[11] 3,585,491

| [72] | Inventor | Tom Kastrup Petersen<br>Nordborg, Denmark |
|---|---|---|
| [21] | Appl. No. | 792,684 |
| [22] | Filed | Jan. 21, 1969 |
| [45] | Patented | June 15, 1971 |
| [73] | Assignee | Danfoss A/S<br>Nordborg, Denmark |
| [32] | Priority | Jan. 23, 1968 |
| [33] | | Germany |
| [31] | | P 16 38 009.9 |

[54] D.C.-FED TWO STAGE REGULATED DIRECT-CURRENT SUPPLY SYSTEM
18 Claims, 5 Drawing Figs.

[52] U.S. Cl. ............................................. 323/9,
321/2, 321/14, 323/20, 323/22, 323/38
[51] Int. Cl. ........................................ G05f 1/56,
G05f 1/58
[50] Field of Search............................................. 321/2, 14;
323/9, 18, 19, 20, 22 SC, 38

[56] References Cited
UNITED STATES PATENTS

| 3,174,096 | 3/1965 | Lichowsky | 323/22 (SC) |
|---|---|---|---|
| 3,303,416 | 2/1967 | Paice et al. | 323/18 |
| 3,323,037 | 5/1967 | Doss | 323/22 (SC) |
| 3,356,930 | 12/1967 | Lupoli et al. | 323/20 |
| 3,375,428 | 3/1968 | Mitchell | 323/22 UX (SC) |

*Primary Examiner*—J. D. Miller
*Assistant Examiner*—A. D. Pellinen
*Attorney*—Wayne B. Easton

ABSTRACT: A DC supply system which is suitable as a DC voltage source for a DC to AC inverter. Two stage regulator means are provided for intermittently actuating a semiconductor switch. The first stage is at constant frequency with the switch being made conductive at the beginning of periods and nonconductive at varying points in the periods to providing conducting intervals of varying length between minimum and maximum lengths. The second stage is at variable frequency with the switch being made conductive for time intervals of constant length. The system is operable to maintain a predetermined voltage subject to the prevention of the load current exceeding a maximum predetermined value.

D.C.-FED TWO STAGE REGULATED DIRECT-CURRENT SUPPLY SYSTEM

The invention relates to a DC-fed, regulated direct-current supply system, wherein a semiconductor element is cut in as a switch having a prescribed repetition frequency and the cut-in period is controlled in dependence upon a required operating condition, e.g., the output voltage, and connected at the outlet side of this switch is a filter circuit consisting, for example, of an L-C filter element and a rectifier connected in series therewith and of opposite pole to the voltage.

A direct-current supply system of this kind is suitable, for example, as a direct-current voltage source for an inverter. The switch accepts, from the DC voltage supplied, only individual impulses which are smoothed out in the subsequent filter circuit to the desired mean voltage.

A control system of this kind is known, wherein a bistable multivibrator acts upon a switch in the form of a transistor, and cuts in the latter at a repetition frequency governed by the multivibrator data, the duration of the impulses being determined by a condenser, which can be loaded in dependence upon the control factors.

In such an arrangement, the period of the impulses cannot however, be reduced to below a prescribed small value because of the ultimate rating of the various components. Thus, the output voltage, too, can be regulated to only a prescribed minimum value. This minimum value can, in many cases, be too great, however, for example if short-circuiting occurs at the output of the direct current supply system. The short-circuit current that then flows at low voltage is still too great for many of the components. This is particularly true in the case of controlled rectifiers which are very sensitive to heavy currents and which it has not been hitherto possible to use in this context. Similarly, it has not been possible to employ the known control system for inverters wherein controlled rectifiers are quenched by brief short-circuiting.

The object of the invention therefore is to provide a DC-fed, regulated direct-current supply system that enables the output voltage to be reduced to considerably lower values than heretofore. In particular, the purpose is to enable the voltage to be reduced to a value such that even in the case of short-circuiting, the currents flowing through the control system remain below a prescribed maximum value.

According to the invention, this object is achieved by not only the width of the impulses being controllable, but the repetition frequency too. In particular, provision can be made for the repetition frequency to be reduced when the width of the impulses is regulated to below a prescribed minimum value.

Due to this intervention in the frequency of the switching action, hitherto not possible, the mean value of the voltage impulses, occurring at the output side, can now be reduced to the desired level. In the extreme case where the repetition frequency is reduced to zero, the output voltage may even be zero.

From the point of view of control technique, this can be advantageously achieved by controlling the switch by a monostable multivibrator with which are associated a generator for impulses of variable length and a variable-frequency generator, and by the frequency generator, upon the length of the impulses falling below a limiting value, being so actuated by a regulating switching means that it produces a lower frequency. Of importance here, is the external control of the multivibrator whereby its frequency can be varied.

It is readily possible to connect the frequency generator and the impulses-length generator to the same output of a common regulating switching means, if there is associated with the frequency generator a limiting value control means which permits the regulating output signal at the frequency generator to become effective only when the limiting value of the control system is reached. As soon as the frequency generator responds, it is of subsidiary importance whether the impulse-length generator is still capable, or not, of further shortening the length of the impulses.

It is particularly advantageous if the impulse-length generator and/or the frequency generator are influenced by a factor proportional to the leading current in such manner that, when a limiting value for the loading current is exceeded, the length of the impulses or the repetition frequency is reduced. This provides absolute resistance to short-circuiting, since, for the purposes of control, direct use is made of those factors that could cause damage in the event of short-circuiting in the control system.

Independently of this, the impulse-length generator can be influenced below the limiting value of the loading current, by the factor proportional to this current, in such manner that the length of the impulses increases as the current rises. In this way, the output voltage of the direct-current supply system can be kept constant even when the load increases. For example, it is possible in this way to keep the speed of a polyphase induction motor constant that is connected by way of an inverter, even when it is quite heavily loaded and tends to slip. In this connection, it is worth noting that the two last-mentioned current-dependent control means operate in opposite directions, the two working ranges being separated from each other by a preferably adjustable limiting value for current.

In particular, the factor proportional to the loading current should be tapped off at a measuring resistor between the switch and the filter condenser. In this way, account is taken not only of the current peaks that occur in the connected consumer equipment, but also peaks in the filter charging current.

In all this, it has to be borne in mind that the normal repetition frequency can be very high, compared with the other frequencies occurring in this connection, for example in the order of magnitude of 1 kilocycle. Since, as can be seen in more detail from the embodiments described below, the intervention of the control arrangement can be effective from one cycle of the repetition frequency to the next, almost instantaneous response to any impermissible variations is ensured.

Figure 2:
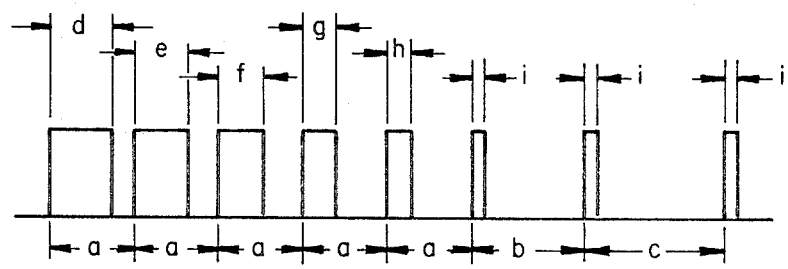
Figure 3:
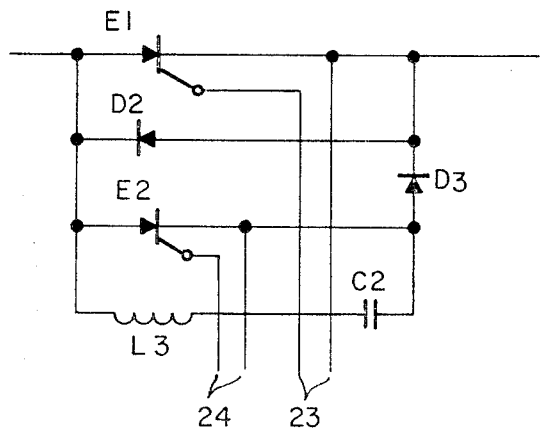
Figure 4:
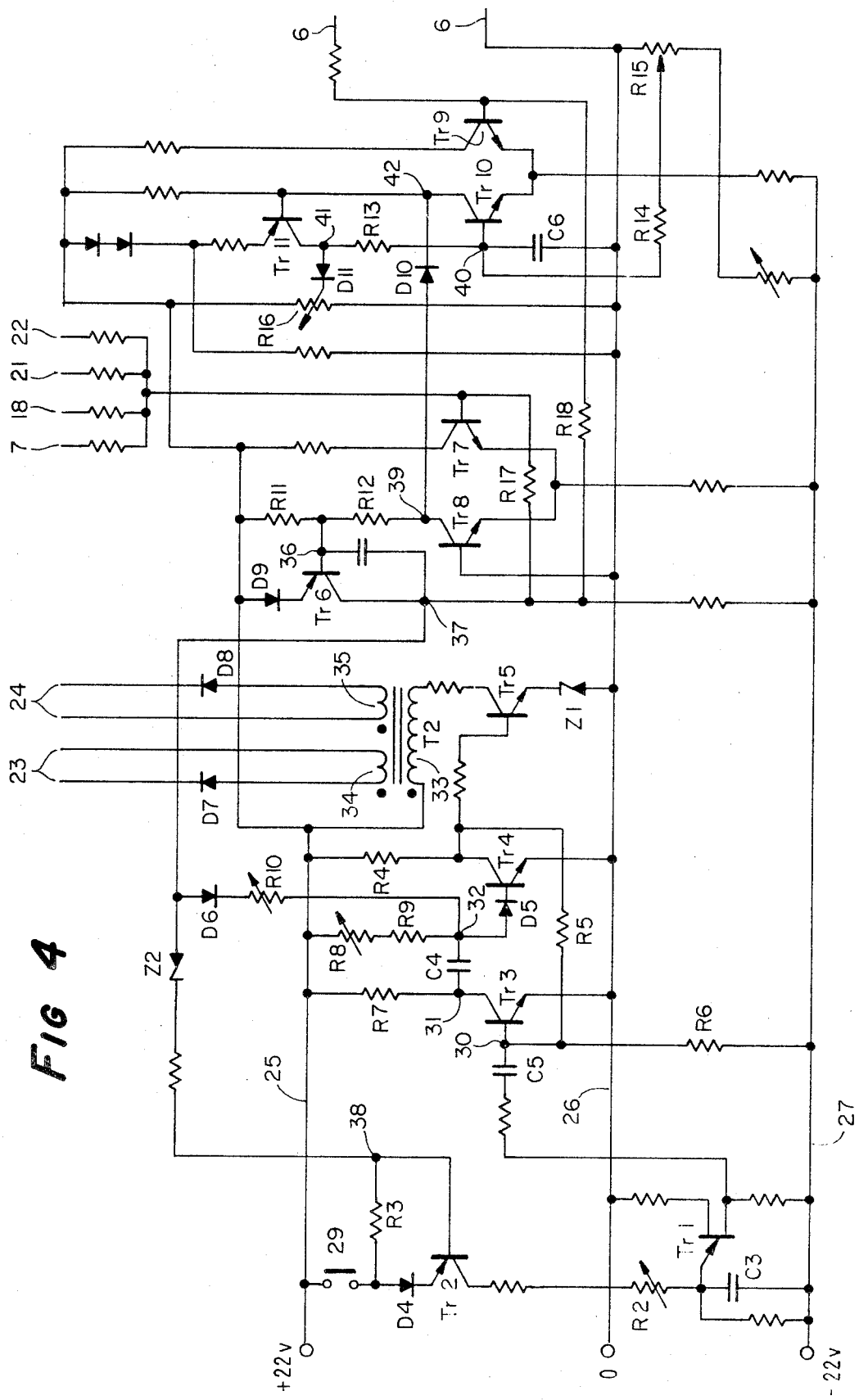
Figure 5:
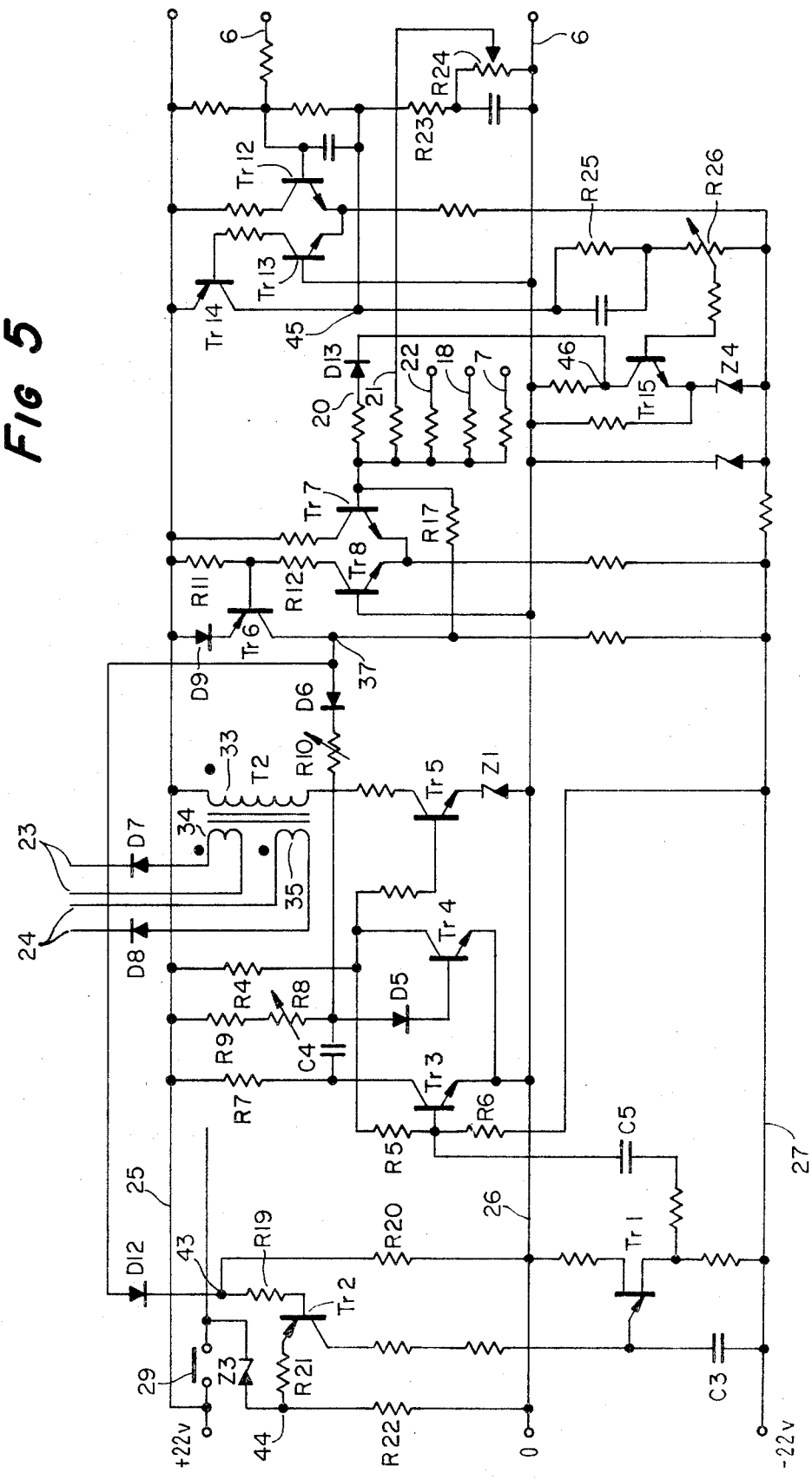

The invention will now be described in more detail by reference to preferred embodiments illustrated in the drawing, wherein:

FIG. 1 is a schematic illustration of the direct-current supply system of the invention, FIG. 2 illustrates, in an impulse diagram, the mode of operation of the switch when the voltage is downwardly regulated, FIG. 3 illustrates an embodiment for an electronic switch with controlled rectifier, FIG. 4 shows a first embodiment of the entire control device for actuating the switch, and FIG. 5 shows a further embodiment of the control device.

Referring to FIG. 1, the terminals 1 and 2 of the supply leads 3 are connected to a constant direct-current voltage U=, which is supplied, for instance, from a bridge rectifier with a smoothing condenser connected to its outlet side. Incorporated in the lead 3 is a switch 4, in practice, a semiconductor switch, which can be cut in and out in a manner to be explained later. Following the switch is a filter element 5, consisting of a choke L1, a condenser C1 and a rectifier D1. Also, connected in front of the filter condenser C1 is a resistor R1, at which a voltage proportional to the current is tapped off through the leads 6. Beyond the filter element 5 there is thus available a regulated DC voltage $U_r$, which is likewise tapped off through leads 7. The regulated voltage supplies a consumer unit 8, which, in the present case consists of a DC to three-phase inverter 9 for driving a three-phase motor 10 with a series-connected short circuit impedance L2. The controlled rectifiers in the inverter 9 are jointly quenched through a switch 11 with the help of which the inverter 9 can be short-circuited.

Associated with the switch 4 is control equipment 12 and this incorporates a monostable multivibrator 13 which is controlled on one hand by an impulse-length generator 14 and on the other by a frequency generator 15. For producing decreasing voltage, a regulating switching means 16 firstly provides for the length of the impulses to be reduced by the generator 14 and then, when a prescribed limiting value is reached, for the frequency to be reduced through the generator 15. The regulating switching means 16 is acted upon by a discriminator 17, which primarily compares the actual voltage $U_r$ with a nominal value for voltage fed through an input point 18, and by a limiting value switching means 19 which is controlled by the loading current. The limiting value switching means 19 can influence the regulating switching means 16 directly or, as shown by the part 20 in broken lines, by way of the discriminator 17. Other input points of the discriminator 17 can be used to produce other effects, for example, a signal dependent upon the slip of the motor 10 can be sent by way of the input point 21 and a signal controlling the course of some process by way of the input point 22.

FIG. 2 shows the distribution of the direct-current impulses let through by the switch 4 when the voltage $U_r$ is to be continuously reduced. At first, the impulses are of constant frequency, illustrated by the constant interval $a$, but their length diminishes as indicated by the dimensions $d-i$. When, however, the limiting value $i$ has been reached, the impulses are protracted timewise, i.e. the repetition frequency is reduced as illustrated by the increasing intervals $b$ and $c$. When the intervals are very great and the smallest length $i$ becomes constant, a voltage $U_r$ of practically zero results.

FIG. 3 illustrates a practical form of construction of the switch 4. The switch itself is constituted by a controlled rectifier E1. In parallel therewith is a diode D2, of opposite polarity, a controlled rectifier E2, of like polarity, and the series connection constituting a condenser C2 and a rotary choke L3. A further diode D3 is also present between D2 and E2. The striking impulses for the controllable rectifier E1 are passed through the leads 23, and the quenching impulses for the controllable rectifier E2, through the leads 24.

When the controllable rectifier E1 is opened, the condenser C2 can be charged to practically the operating voltage. This charging continues, due to the diode D3, until the rectifier E1 is struck. Only when the rectifier E2 receives a quenching impulse does the condenser C2 discharge through the rotary choke L3, whereby it is charged in the opposite direction. In this way, an inverse voltage occurs through the controllable rectifier E1, so that this is quenched. The same applies in the case of the controllable rectifier E2. Then, the condenser C2 can be recharged to its initial condition by way of the diodes D3 and D2, the losses that occur being covered by the operating voltage.

In the control equipment shown in FIG. 4, voltages of +22.0 and −22 v. are available at three supply leads 25, 26 and 27. In the drawing, only those components of the control system that are mentioned in the following description are marked with reference symbols.

Using a unijunction transistor Tr1 a variable frequency pulse generator hereafter referred to as a frequency generator, is constructed by way of which a charging condenser C3 is always discharged and sends an impulse to the output of the transistor when the latter is charged to a prescribed voltage value. As charging resistors for this condenser, use is made of, inter alia, a setting resistor R2 and a transistor Tr2. the base of which is connected to the emitter through a resistor R3 and in the emitter lead of which are connected a main switch 29 and a diode D4. The variable frequency pulse generator so far described is set in such manner that it gives out impulses having a constant repetition frequency of about 1 kilocycle.

The monostable multivibrator 13 comprises two transistors Tr3 and Tr4. Between the collector of the first transistor Tr3 and the base of the second transistor Tr4 is connected an impulse-length condenser C4 and a diode D5. Normally, the second transistor Tr4 is conducting so that there occurs at the resistor R4 a voltage drop which, taking into account the resistors R5 and R6, keeps the base potential of the first transistor Tr3 so low at the point 30 that this is blocked. In the meantime, the condenser C4 is charged by way of the resistor R7 to an extent such that the point 31 is positively biased relatively to the point 32. If an impulse is now passed from the frequency generator through the condenser C5 to the base of the transistor Tr3, so that the latter becomes ignited, the collector current flows through the resistor R7, whereupon the potential at the point 31 drops to a considerable extent. The potential at the point 32 drops correspondingly lower, so that the transistor Tr4 is blocked. This condition is maintained until the condenser C4 has discharged through the resistor R7, the adjustable resistor R8 and the resistor R9 to an extent such that the point 32 has reached a potential that again renders the transistor Tr4 conducting. In parallel with the resistors R8 and R9 is a branch containing an adjustable resistor R10 and a diode D6, through which branch the condenser C4 can likewise discharge and which will be described in more detail later.

The transistor Tr4 controls the base of a transistor Tr5, the emitter of which is connected by way of a Zener diode Z1 to the neutral lead, and the collector of which is connected to the lead 25 through the primary winding 33 of a transformer T2. The two secondary windings 34 and 35 are each provided with a rectifier D7 and D8, so that they send the required striking and quenching impulses through the leads 23 and 24. The transistor Tr5 is blocked when the transistor Tr4 is conducting; it is conducting when the transistor Tr4 is blocked. The Zener diode Z1 caters for the current through the transistor Tr5 having steep flanks. Each ascending flank results in a striking impulse and each descending flank in a quenching impulse.

The regulating switching means comprises a transistor Tr6 in the emitter lead of which is connected a rectifier D9. The basis potential at the point 36 is determined by the current flowing in the resistors R11 and R12. Connected to one side of the collector output 37 of this transistor Tr6 is the branch comprising the diode D6 and the resistor R10 of the condenser C4 constituting the impulse-length generator and, to the other side, the base of the transistor Tr2 by way of a Zener diode Z2. The resistance of the transistor Tr2, i.e., the voltage at the point 37 therefore ultimately determines the impulse-length and the frequency.

a. Impulse length If the transistor Tr6 is blocked, the condenser C4 which determines the length of the impulses is recharged only through the branch comprising the resistors R8 and R9. The setting of the resistor R8 therefore determines the maximum length of impulse. If the transistor Tr6 is fully conducting, recharging takes place largely through this transistor and the resistor R10. The setting of the resistor R10 therefore determines the minimum length of impulse. The transition from maximum to minimum length of impulse can take place continuously by means of the base voltage of the transistor Tr6.

b. Frequency The resistor R3 seeks to hold the base point 38 of the frequency generator transistor Tr2 at about +22 v. In normal operation, the output point 37 of the regulating circuit is at so low a potential that the Zener diode Z2 is conducting and, in this way, the base potential at the point 38 drops, so that the transistor Tr2 passes current well. If, however, the transistor Tr6 is closed still further (and the length of the impulse is accordingly still further reduced), then the point 37 acquires a potential at which the Zener diode Z2 blocks. Consequently, the base point 38 is also raised and the transistor Tr2 acquires a high resistance value through which the condenser C3 is charged correspondingly more slowly, and this leads to the required reduction of frequency.

The discriminator 17 with its four inputs 7, 18, 21 and 22, each having a resistor, is connected to the input point 39 of the regulating switching system by way of a sum-and-difference amplifier having a first transistor Tr7 and a second transistor Tr8. The sum-and-difference amplifier is of asymmetrical design. The discriminator is connected to the base of the first transistor Tr7. The base of the second transistor Tr8 is connected to neutral. The transistors are connected in a manner complementary to that of the transistor Tr6.

Also, connected to the point 39 by way of a diode 10 is a limiting value control means, which comprises a sum-and-difference amplifier, of very similar design, and having a first transistor Tr9 and a second transistor Tr10. A line 6 for measuring the factor proportional to the loading current is connected to the base of the first transistor Tr9. The base of the second transistor Tr10 is connected to the neutral lead 26 by way of a condenser C6. Connected in the output branch of the second transistor Tr10 is a complementary, DC-coupled third transistor Tr11, the collector of which is connected, by way of a resistor R13, to the base point 40 of the second transistor Tr10. A constant, negative voltage is supplied to the point 40 through a resistor R14 from a voltage divider R15. A voltage divider resistor R16 prevents the potential at the collector point 41 from rising above a prescribed value, a diode D11 being interposed. The bases of the two first transistors Tr7 and Tr9 are connected in opposition to the collector of the regulating transistor Tr6 by way of feedback resistors R17 and R18.

With the help of the discriminator and of the sum-and-difference amplifier associated therewith, the regulating transistor Tr6 can be so controlled that a given initial voltage $U_r$ can be held. The effect of this amplifier is immediately cut off, however, when the other sum-and-difference amplifier comes into action. This is the case when the voltage signal, proportional to the loading current, in the line 6 reaches the potential at the point 40, which potential can be adjusted as required to a given maximum loading current. In this case, the current is very considerably amplified through the transistor Tr10, since the condenser C6 is recharged by way of the transistor Tr11 and the potential at the point 40 is thereby raised. This positive feedback is, of course, limited, since the potential at the point 41 cannot fall below the potential determined by the resistor R16. In the condition of equilibrium, the collector at the point 42 then is of such potential that the regulating transistor Tr6 is adjusted to an extent such that the frequency generator switches over to a lower frequency. This means that when excess current occurs, the frequency immediately drops to an extent such that the initial voltage $U_r$ becomes almost zero and therefore no excess currents can adversely affect the circuit elements in the direct-current supply system.

In the example shown in FIG. 5, the switching elements are marked with the same reference symbols if they perform the same function as in the preceding switching system. Hereinafter, only the modified groups in the switching means will be explained. Here, another form of control of the frequency emitter and another way of considering the factor proportional to the current are dealt with.

The base of the transistor Tr2 of the frequency generator is connected to the neutral lead through resistors R19 and R20. A connection runs to the intermediate point 43 from the output point 37 of the regulating switching means by way of a diode D12. The emitter is likewise connected to neutral through resistors R21 and R22. The connecting point 44 is, however, connected to the lead 25 by way of a Zener diode Z3 and the main switch 29. In normal operation, the Zener diode Z3 is struck, and a heavy current flows by way of the transistor Tr2 to the condenser C3. When the point 37 has reached the potential of point 43, a current follows through the diode D12 through which the base potential of the transistor Tr2 is raised. The transistor is thereby gradually turned off so that the condenser C3 charges more slowly and the frequency of the frequency generator is reduced. When the current through the transistor has become so small that the potential at point 44 no longer suffices to keep the Zener diode Z3 struck, the latter closes, and only a very low current can be passed by way of the resistor R22 through the transistor Tr2, so that the frequency is suddenly considerably reduced.

Thus, in this switching means, the frequency of the frequency generator is gradually reduced when a first limiting value (corresponding to a certain width of impulse) is reached, this value being determined by the potential at the point 43. When a second limiting value, determined by the threshold value of the Zener diode Z3, is reached, the frequency is suddenly reduced to an extremely low value.

The voltage proportional to the loading current is passed by way of the lead 6 to a sum-and-difference amplifier, which incorporates the two transistors Tr12 and Tr13. One control lead 6 is connected to the base of the first transistor Tr12 and the other supply lead is connected to the neutral lead which is connected to the base of the other transistor Tr13. In the output circuit of the last-named transistor, there is provided a complementary, DC-coupled transistor Tr14, the collector of which is connected, at the point 45, to two voltage dividers. The first voltage divider consists of the resistors R23 and R24. A connecting lead runs from a tapping on the last-named resistor to the input point 21 of the discriminator. At this point, a factor can be picked up, with the help of which increase in current can be compensated by a lengthening of the impulses, so that, for example, the slip of a motor can be offset. The second voltage divider comprises the resistors R25 and R26, the latter of which is connected to the base of a transistor Tr15 by way of a tapping. This voltage divider extends to the negative lead 27. The tapping at the resistor R26 enables the maximum permissible short circuit current to be set. The transistor Tr15 is connected by its emitter to the negative lead 27 by way of a Zener diode Z4. The collector is connected, at the point 46, to the input point 20 of the discriminator, by way of a diode D13. The last-mentioned switching means responds when the voltage, tapped off at the resistor R26, exceeds the threshold value of the Zener diode Z4, the transistor Tr15 suddenly becoming conducting and passing to the discriminator a negative voltage of such strength that the latter brings the regulating transistors Tr6 rapidly to its fully open position. The frequency of the frequency emitter is hereby reduced in the desired manner.

The illustrated examples of the arrangement can be modified in various ways without thereby departing from the basic concept of the invention. For example, the striking impulses can be picked up directly at the output point of the unijunction transistor. The switching means illustrated is more advantageous however, since it can only give off striking impulses when it has been ensured that the system can also produce a quenching impulse.

It is not necessary for the loading current to be adjusted down to zero in each case, if a prescribed limiting value is exceeded. With the help of the resistor R16, it is possible to determine the slope of the curve for the reduction of the current with decreasing voltage.

The switching means can be used not only in combination with controlled rectifiers forming the switch 4, but also in combination with known transistors.

I claim:

1. A regulated DC supply system wherein a switching type regulator is controllable both in response to a constant frequency variable pulse width first stage and to a variable frequency minimum pulse width second stage for very light loads comprising, a semiconductor controlled rectifier switch and a control circuit therefore, two stage regulator means for intermittently activating said switch by way of said control circuit to effect conducting and nonconducting thereof, said control circuit comprising a monostable multivibrator, said regulator means comprising a constant frequency pulse generator first stage for controlling said multivibrator and making said switch conductive at the beginning of periods and for stopping the conducting of said switch at varying points in said periods to provide conducting intervals of varying lengths between a maximum length and a minimum length, said regulator means further comprising frequency modifying control means connected to said constant frequency pulse generator to form a variable frequency pulse generator second stage for making said switch conductive for intervals of constant lengths substantially equal to said minimum length, and regulating switching means for activating said second generator when said conducting intervals of said first stage reduce to the length of said minimum length, said regulator means being operable to maintain a predetermined voltage subject to the prevention of the exceeding of a predetermined maximum current, and filter means at the outlet side of said switch.

2. A regulated DC supply system according to claim 1 wherein said variable frequency second stage of said regulator operates at varying frequencies less than said constant frequency.

3. A regulated DC supply system according to claim 2 wherein said first and second generators are connected to a common output of said regulating switching means, said regulating means including limiting current value control means operably connected to the input of said regulating switching means, said limiting current value control means being responsive to the current value in said supply system and being operable to limit the output of said system to prevent said current from exceeding said predetermined maximum value.

4. A regulated DC supply system according to claim 3 including a discriminator, said regulating switching means including a transistor which is controllable by the voltage output of said discriminator.

5. A regulated DC supply system according to claim 4 wherein the output of said limiting current value control means is operably connected to an input of said discriminator.

6. A regulated DC supply system according to claim 4 wherein said limiting current value control means is connected to an input of said discriminator said discriminator having a plurality of inputs, said limiting current value control means having a signal upon the limiting current value being exceeded which outweighs all other discriminator input signal values.

7. A regulated DC supply system according to claim 4 including three supply leads with one of said leads being neutral, the discriminator comprising a sum and difference amplifier comprising first, second and third transistors, current monitoring means having an output connected to the base of said first transistor, the base of said second transistor being connected to said neutral lead, said third transistor being in the collector circuit of said second transistor, first and second voltage dividers connected to the collector of said third transistor with the tapping of said first divider connected to one input of said discriminator to produce a compensating increase in the load current and the tapping of said second divider connected to another input of said discriminator to produce a limiting effect on the load current to prevent the load current from exceeding a limiting value.

8. A regulated DC supply system according to claim 4 including a sum and difference amplifier, said discriminator and said amplifier being connected to the input of said regulating switching means.

9. A regulated DC supply system according to claim 2 including limiting current value control means responsive to the current value in said supply system, said limiting current value control means being effective to actuate said first generator to shorten the lengths of said conducting intervals and to actuate said second emitter to reduce the frequency thereof.

10. A regulated DC supply system according to claim 2 wherein said first generator effects increasing the lengths of said conducting intervals proportionally relative to an increase in said current in a range below said predetermined maximum current.

11. A regulated DC supply system according to claim 10 wherein a measuring resistor is disposed between said semiconductor switch and said filter means, means connected to said resistor for sensing the value of the current flowing through said resistor.

12. A regulated DC supply system according to claim 2 wherein said second generator comprises a unijunction transistor relaxation generator having a charging condenser and a charging resistance means, said charging resistance means including a normally conducting transistor, said transistor having an increase in the resistance thereof caused by a decrease in the base potential thereof occurring when said conducting intervals decrease to said minimum length.

13. A regulated DC supply system according to claim 12 wherein the base of said transistor is connected to the output of said regulating switching means with a Zener diode being disposed therebetween, and a resistor disposed between said base and said transistor emitter.

14. A regulated DC supply system according to claim 12 including three supply leads with one of said leads being neutral, a voltage divider connected to said neutral lead, said transistor base being connected to said voltage divider, a tapping for said voltage divider, said output of said regulating switching means being connected to said tapping, and a rectifier disposed between said output and said tapping.

15. A regulated DC supply system according to claim 12 wherein a Zener diode is disposed in said base circuit of said transistor.

16. A regulated DC supply system according to claim 2 including a capacitor coupling said first generator and said multivibrator, said multivibrator including first and second transistors and a condenser, said condenser being connected between the collector of said first transistor and the base of said second transistor, an adjustable resistor in parallel with said condenser, said condenser being rechargeable through said adjustable resistor and said regulating switching means.

17. A regulated DC supply system according to claim 2 including a discriminator, said regulating switching means including a transistor which is controllable by the voltage output of said discriminator.

18. A regulated DC supply system according to claim 17 including a sum and difference amplifier comprising a pair of transistors, said amplifier being connected between said discriminator and said regulating switching means.